United States Patent [19]

Schaap

[11] 3,899,605
[45] Aug. 12, 1975

[54] PROCESS OF PREPARING A FAT EMULSION

[75] Inventor: Johannes Emmus Schaap, Lunteren, Netherlands

[73] Assignee: Stichting Bedrijven van het Nederlands Instituut voor Zuivelonderzoek, Ede, Netherlands

[22] Filed: Sept. 5, 1973

[21] Appl. No.: 394,446

[30] Foreign Application Priority Data
Sept. 5, 1972 Netherlands............... 7212074

[52] U.S. Cl.................. 426/582; 426/519
[51] Int. Cl............................. A23c 19/12
[58] Field of Search .......... 426/188, 357, 519, 361, 426/363, 362, 194, 199, 201

[56] References Cited
UNITED STATES PATENTS

| | | | |
|---|---|---|---|
| 2,650,879 | 9/1953 | Peebles................. | 426/357 |
| 3,078,167 | 2/1963 | Rice..................... | 426/357 |
| 3,080,235 | 3/1963 | Hodson................. | 426/357 |
| 3,278,310 | 10/1966 | Williams............... | 426/357 |
| 3,716,377 | 2/1973 | Bratland............... | 426/188 |
| 3,843,828 | 10/1974 | Arnot................... | 426/519 |

Primary Examiner—Norman Yudkoff
Assistant Examiner—Hiram H. Bernstein
Attorney, Agent, or Firm—Buell, Blenko & Ziesenheim

[57] ABSTRACT

Cheese is prepared by forming an emulsion mixture by mixing (a) a milk fraction containing casein and having a low fat content and (b) an emulsified fat having been subjected to a treatment to divide it into finely dispersed particles, particularly globules, the size distribution of which approximately corresponds to that of fresh cow's milk, said treatment comprising the steps of mixing the fat prior to emulsifying at a temperature up to 50°C, with whey originating from the making of cheese, subjecting the mixture to a shearing action until the fat has been divided in particles having a diameter of from 1½–6μm and an average of 3μm, and subsequently mixing said blend with said milk fraction containing casein and having a low fat content.

8 Claims, No Drawings

PROCESS OF PREPARING A FAT EMULSION

This invention relates to a process of preparing a fat emulsion by mixing:
- a. a milk fraction containing casein and having a low fat content, and
- b. a fat having been subjected to a treatment to divide it into finely dispersed particles, particularly globules, the size distribution of which approximately corresponds to that of fresh cow's milk.

Such a process is known already from Dutch patent application No. 71.04406, at which a fluid fat is injected into a stream of skim milk and at which immediately prior to the injection step the difference in pressure between the fluid fat and the skim milk amounts to at least 100 at, and the pressure in the skim milk amounts to at least 0.3 at. In said way the fat is emulsified in the skim milk. Starting from a given size of the opening through which the fat is injected into the skim milk, the size of the fat particles is fixed by the temperature and pressure used. At said process the deposition of casein micelles on the fat globules is not prevented, though the modification in structure of the casein micelles that occurs at homogenizing according to the publication of S. Henstra and D. G. Schmidt in the Ned.Melk en Zuiveltijdschrift 24, 45 (1970) is precluded. Such emulsions are particularly proper to be used as coffee cream.

Further from Dutch patent application No. 69.13366 it is known that in a milk fraction containing casein and having a low fat content, an emulsion of fats, at least 25% by weight of which consists of non-milkfats, may be prepared by dispersing the fluid fat in a milk fraction containing from 6 to 12% by weight of dry solids not fat. Owing to said treatment the fat phase is enriched with phospholipids and then in some way an emulsion is prepared, e.g. by means of a clarifixator or even just by pumping it. In said publication the understanding is failing that cheese prepared from said emulsion will have a proper texture only if the cheese milk as such is not subjected to a homogenizing treatment.

At the preparation of cheese from such a homogenized milk substitute or from a homogenized natural milk often difficulties are experienced owing to the fact that due to the homogenizing treatment a cheese having a texture-defect is obtained, particularly a cheese having too soft or gritty a body. Vide in this connection for example J. G. Davis, Cheese, vol. I, page 149 (London W, 1965, J. and A. Churchill) and J. J. Peters, J. Dairy Sci. (1956) 39, 1083. Said texture-defect might be attributed to the modification in structure that takes place in milk during homogenizing. Vide the abovementioned publication of S. Henstra and D. G. Schmidt.

It was found now, that the abovementioned objections may be prevented by mixing the fat prior to emulsifying, at a temperature of up to 50°C., with whey originating from the making of cheese, which is inherently free of casein micelles, subjecting the mixture to a sheering action until the fat has been divided into particles (predominantly globules) having a diameter of from 1½ to 6 $\mu$m and an average diameter of 3 $\mu$m, and subsequently mixing said blend with a milk fraction containing casein indeed and having a small fat content. In said way the casein of the milk is not subjected to the treatment, at which the fat is processed into a finely divided condition. Subsequently said cheese milk may be curdled and processed into cheese that does not show texture-defect either being gritty, or being too smooth or seeming somewhat incoherent. Milkfat as well as non-milk fats may be used as the fatty material.

The fat may be divided finely by means of a high pressure homogenizer, a clarifixator (vide "From Idea to Product," pages 15–22 of the "75th Jubilee Memorial Publication of the Association of Swedish Inventors," Stockholm 1961), a colloid mill or by means of ultrasonic vibrations.

Consequently the gist of the process is, that the fat is emulsified in a medium different from skim milk and being substantially free of casein micelles and the size distribution of the fat globules in the emulsion is substantially identical to that of natural milk. The whey obtained from cheese making may be pasturized before using it, if desired.

Subsequently the fat emulsion obtained is mixed in such proportions with skim milk or slightly skimmed milk, that the desired fat: casein ratio is obtained. At said mixing a treatment to achieve a homogeneous distribution of the fat is superfluous. The mixture may be curdled in the usual way and processed into cheese. The cheese thus obtained shows a normal texture too and the smell and taste show, provided a good quality of fat has been used, no deviations. Preferably milkfat or a fat fraction obtained from milkfat is used as the fatty material.

The dispersion of fat in whey preferably contains from 10% – 60% by weight of fat.

Fat emulsions prepared according to the process of the invention may not only be used for preparing cheese milk, but also for preparing butter or whipped cream, at which emulsions having a high fat content, e.g. 40% by weight, are used. If such emulsions (cream) are prepared by homogenizing the fat in skim milk, at churning or whipping difficulties are experienced. Butter prepared therefrom may contain too much solids not fat or the water present may be distributed poorly. If such a cream is used to prepare a whipped cream, the cream appears to have poor whipping properties. This is observed as a long whipping time, an insufficient consistence of the whipped product and the occurrence of butter lumps.

At processing fat emulsions prepared according to the invention, said difficulties are not encountered.

The process according to the invention is particularly important for preparing cheese milk from milk fat (especially butter oil and milk fat fractions) and if desired from skim milk powder at times and places where insufficient natural full cream milk is available for preparing cheese having the desired fat content.

The process is elucidated by the following examples.

EXAMPLE I

Commercially available butter oil was first melted by heating up to 60°C and subsequently heating at 20°, 30°, 40°, 50°, 60° or 80°C. At said temperature the butter oil was processed into an emulsion having a fat content of 30% by weight by mixing it with a proportion of whey of the same temperature. The whey used was the so-called first whey, originating from the making of Gouda cheese, from which said whey had just been separated. After mixing homogenizing was performed by means of a "Rannie" one step laboratory homogenizer having a capacity of appr. 100 l/h. The homogenization pressure used was 1 MPa (about 10 atmospheres). The emulsion obtained was added to cold skim milk that had been subjected to a thermization treatment until the fat content of the mixture amounted to 3% by weight. Said cheese milk was pasteurized for 10 sec. at 74°C and cooled to 30°C. Then rennet (strength 1 : 10.000) and a 35% by weight aqueous solution of $CaCl_2$, both in a proportion of 30 ml per 100 l milk, were added. After a normal curdling time of 30 min. the curd was cut and judged for firmness. Said firmness was too low if the milk had been prepared from fat emulsions heated at a temperature exceeding 50°C; at the other samples it was rather good, but in all cases a greater percentage of fat globules having a diameter of 5 and 6 $\mu$m was present than in natural milk, owing to which the size distribution did not meet that of natural milk and this resulted in an observable separation of free milkfat.

EXAMPLE II

According to example I fat emulsions were prepared at 30°C and at 60°C, but said emulsions were homogenized at 5, 10 or 20 MPa. Further according to example I a cheese milk was prepared, curdled and cut. The curd from the milk, containing fat emulsified at 30°C, had a usual firmness; the curd of the emulsion prepared at 60°C was again too soft. However, in all cases some creaming could be observed owing to the formation of clusters of fat globules having an average diameter of 3 $\mu$m at homogenizing.

EXAMPLE III

By means of a commercially available butter oil a number of mixtures was prepared that were used as cheese milk. Now the formation of clusters of fat globules mentioned in example II was prevented by pumping the fat emulsion another time in a second step through the homogenizer under a pressure of 1 MPa. Both operations were performed at 35°C. The pressure at the first homogenization was 5 MPa. The butteroil was melted by heating up to 60°C and subsequently mixed with:
1. fresh first whey, originating from the making of Gouda cheese (tests 6 and 7);
2. fresh second whey, originating from the making of Gouda cheese (test 8);
3. acid first whey, not neutralized (test 11);
4. acid first whey, after neutralization with NaOH up to a pH value of 6.7 (test 12);
5. skim milk (test 5);
6. a 2% by weight aqueous solution of a commercially available dried hen-egg-protein (test 13);
7. a 0.06% by weight aqueous solution of Tween 80 (test 14);
8. a mixture of a first whey and skim milk in the ratio 9 till 1 parts by volume (test 9);
9. a similar mixture from equal parts by volume (test 10).

Each mixture was homogenized at 35°C under a pressure of 5 MPa and subsequently homogenized another time under a pressure of 1 MPa. The emulsion containing in all cases 30% by weight of milkfat, was mixed with skim milk that had been subjected to a thermization treatment until a fat content of 3.0% by weight had been achieved. At test 15, instead of butter oil, soy oil was used, after all in a completely identical way. In comparison with the thus prepared cheese milk the following kinds of cheese milk were used likewise:
a. normal cheese milk (test 1);
b. normal cheese milk, to which 10% by volume of a fresh first whey had been added (test 2);
c. cheese milk prepared by mixing skim milk and cream until a fat content of 3.0% by weight had been obtained (test 3) and
d. cheese milk prepared in the same way, but by using homogenized cream (test 4).

The chese milk was pasteurized for 10 sec. at 74°C and subsequently cooled and after cooling at 30°C introduced in a cheese vat. At each test 120 l of cheese milk were curdled by adding 36 ml commercially available rennet (strength 1 : 10.000) and 36 ml of a 35% by weight aqueous solution of $CaCl_2$ after having added 24 g $KNO_3$ and 1.2 l of a starter.

After the curd had become sufficiently firm, it was cut, and further processed into cheese in the usual and every time identical way. However, taking into account the addition of water or whey at preparing the emulsions and at the cheese milk of test 2, always 65 l of first whey were drained off after the first treatment of the curd — except in tests 1, 3 and 4 where 60 l of whey were drained off.

The cutting times used, as well as some other data about the preparation have been mentioned in table A, in which further analysis data about the cheese prepared and the whey drained off have been stated. The fat distribution in the cheese milk mentioned in table A was determined by observing a droplet of said milk under a microscope. The fat content and the curdfines content of the first and second whey drained off have been determined.

24 hours after starting the curdling step the pH of the cheese was determined and after a fortnight the water content and the fat content as well as the pH value were determined. Moreover the texture and the taste of the cheese were judged after six weeks and after approximately three months.

From the data mentioned in table A appears, that the cheese prepared by emulsifying butter oil in whey, had a reasonable consistence in every respect, comparable completely with that of normal cheese (tests 6 and 7, and 1 resp.). The consistence was better than that of the cheese from homogenized milk (test 5). The evaluation of the consistence of the cheese was already poorer, if even just a bit of homogenized milk (tests 9 and 10) had been added.

During the preparation of cheese was observed, that the curd obtained in tests at which butter oil was homogenized into whey, and the emulsion was mixed subsequently with skim milk, had the behaviour of curd from usual normal cheese milk (test 1).

EXAMPLE IV

A cream obtained from butter oil according to example III was pasteurized in a normal way, inoculated and cultured and subsequently churned. For comparison butter oil was emulsified in skim milk too, processed into butter under identical conditions, as well as cream obtained from milk by centrifuging in the usual way. Some data about the production of butter have been mentioned in table B.

As appears from the high content of dry solids not fat the butter of test $B_1$ contains too much protein. This is also a consequence of the fact that the fat was present in the emulsion in a too finely divided condition. Due to said condition it appeared to be difficult to achieve the right water content at working the butter. Moreover this involves that a lot of fat is lost by remaining in the buttermilk. On using whey as a medium to emulsify the fat said difficulties do not occur.

heese, subjecting the mixture to a shearing action until the fat has been divided in particles (predominantly globules) having a diameter of from 1 ½ –

TABLE A

| NO.[1] | [2] | Curd at the cutting step[8] | Curd after having drained off the whey | Time of stirring (min.) | pH cheese 1 day | after a fortnight in cheese | | fat in dry solids | first whey | | second whey | | Homogenized casein | Judgement of consistence | |
|---|---|---|---|---|---|---|---|---|---|---|---|---|---|---|---|
| | | | | | | pH | H₂O | | fat × 0,01% | curd fines mg/kg | fat × 0,01% | curd fines mg/kg | | after 6 wks. | after 3 mos. |
| 1 | k | 2.7 | n | n | 35 | 5.07 | 5.15 | 42.3 | 48.6 | 25 | 133 | 19 | 326 | — | 6.8 | 6.3 |
| 2 | k¹⁰ | 2.3 | n | n | 35 | 5.07 | 5.18 | 42.1 | 47.1 | 26 | 163 | 13 | 219 | — | 6.5 | 6.3 |
| 3 | or | — | n | n | 40 | 5.19 | — | — | — | 35 | 151 | 22 | 152 | — | 6.9 | 6.6 |
| 4 | ohr | — | v | v | 35 | 5.09 | 5.18 | 41.0 | 56.4 | 30 | 165 | 14 | 163 | + | putty like | 6.1 |
| 5 | bo | — | n | m | 50 | 5.07 | 5.19 | 39.9 | 55.6 | 7 | 649 | 9 | 621 | + | like | 1.5 |
| 6 | be | — | n | n | 38 | 5.09 | 5.20 | 39.6 | 53.7 | 17 | 148 | 25 | 634 | — | 6.5 | 6.6 |
| 7 | be | 3.3 | n | n | 40 | 5.11 | 5.16 | 39.7 | 52.5 | 29 | 210 | 31 | 498 | — | 5.8 | 5.3 |
| 8 | bt | 2.3[5] | n | n | 40 | 5.13 | 5.22 | 40.8 | 59.0 | 27 | 187 | 23 | 570 | — | 5.6 | 5.1 |
| 9 | be¹⁰ | 1.9 | n | p | 45 | 5.17 | 5.28 | 43.1 | 43.1 | 66 | 462 | 211 | 587 | + | non-homogeneous | |
| 10 | be⁵⁰ | 2.3[3] | n | n | 40 | — | 5.31 | 42.8 | 43.5 | 49 | 195 | 51 | 336 | + | 4.6 | 5.0 |
| 11 | bze | 3.5[4] | n | n | 30 | 5.08 | 5.21 | 39.3 | 52.6 | 25 | 196 | 23 | 269 | — | 6.3 | — |
| 12 | bne | 2.3 | n | n | 40 | 5.05 | 5.16 | 40.0 | 53.2 | 20 | 354 | 27 | 668 | — | 5.6 | — |
| 13 | bki | 2.4 | n | n | 45 | 5.07 | 5.14 | 42.1 | 48.3 | 54 | 431 | 45 | 660 | — | 5.9 | 5.3 |
| 14 | b⁸⁰ | 3 | n | n | 25 | 5.18 | — | — | — | — | — | — | — | — | 4.9 | — |
| 15 | se | — | n | n | 30 | — | 5.27 | 43.8 | 49.1 | — | — | — | — | — | 5.1 | 4.6 |

[1] Elucidation:
k = normal cheese milk
k¹⁰ = cheese milk containing 10% by weight of first whey
or = skim milk + cream
ohr = skim milk + homogenized cream
b = melted butterfat          homogenized in
s = soy oil
[2] fat distribution, average diameter fat globules ($\mu$m)
[3] fat globules in clusters
[4] few small fat globules
[5] somewhat creamed
[6] creamed
[7] some free fat present
[8] elucidation:
n = normal
v = rather normal
m = difficult to dry
p = pappy curd
o = skim milk
e = first whey
t = second whey
e¹⁰ = first whey containing 10% by weight skim milk
e⁵⁰ = first whey containing 50% by weight skim milk
ze = acid first whey
ne = neutralized acid first whey
ki = 2% by weight aqueous solution of hen-egg-protein
*⁾ = 0.06% by weight aqueous solution of Tween 80

TABLE B

| Butter produced from | Churning time | Fat content of buttermilk | H₂O content of butter | Dry solids not fat in butter | Judgment | |
|---|---|---|---|---|---|---|
| | | | | | Smell and taste | Consistence |
| 1. Butter oil + skim milk | 150 min. | 4.2% b.w. | 18.1% b.w. | 3.5% b.w. | 5.9 | 5.3 |
| 2. Butter oil + first whey | 37 min. | 1.3% b.w. | 12.0% b.w. | 1.0% b.w. | 6.3 | 6.8 |
| 3. Normal cream | 35 min. | 0.9% b.w. | 13.7% b.w. | 0.8% b.w. | 6.1 | 6.8 |

What we claim is:
1. A process of preparing a fat emulsion by mixing
   a. a milk fraction containing casein and having a low fat content and
   b. an emulsified fat having been subjected to a treatment to divide it into finely dispersed particles, particularly globules, the size distribution of which approximately corresponds to that of fresh cow's milk, said treatment comprising the steps of mixing the fat prior to emulsifying at a temperature up to 50°C., with whey originating from the making of cheese, subjecting the mixture to a shearing action until the fat has been divided in particles (predominantly globules) having a diameter of from 1 ½ – 6 $\mu$m and an average of 3 $\mu$m, and subsequently mixing said blend with said milk fraction containing casein and having a low fat content.

2. A process according to claim 1, characterized in using milkfat as the fat.

3. A process according to claim 1, characterized in using a fat fraction obtained from milkfat as the fat.

4. A process according to claim 1, characterized in using soy oil as the fat.

5. A process according to claim 1, characterized in using a fat fraction obtained from soy oil as the fat.

6. A process according to claim 1, comprising preparing a dispersion of fat in whey originating from the cheese making, which dispersion contains from 10–60% by weight of fat.

7. A process of making cheese, free from texture defect by preparing an emulsion mixture by mixing
   a. a milk fraction containing casein and having a low fat content and
   b. an emulsified fat having been subjected to a treatment to divide it into finely dispersed particles, particularly globules, the size distribution of which approximately corresponds to that of fresh cow's milk, said treatment comprising the steps of mixing the fat prior to emulsifying at a temperature up to 50°C, with whey originating from the making of cheese, subjecting the mixture to a shearing action until the fat has been divided in particles having a diameter of from 1½–6μm and an average of 3μm, and subsequently mixing said blend with said milk fraction containing casein and having a low fat content.

8. A shaped cheese, prepared according to the process of claim 7 and placed in a mold of desired shape and further processed into a matured cheese.

* * * * *